(12) United States Patent
Liccardi

(10) Patent No.: US 8,544,817 B2
(45) Date of Patent: Oct. 1, 2013

(54) MANUAL VALVE OPERATOR WITH OVERRIDE CLUTCH APPARATUS

(75) Inventor: Domenico Liccardi, Legnano (IT)

(73) Assignee: Regal Beloit America, Inc., Beloit, WI (US)

( * ) Notice: Subject to any disclaimer, the term of this patent is extended or adjusted under 35 U.S.C. 154(b) by 1209 days.

(21) Appl. No.: 12/157,597

(22) Filed: Jun. 11, 2008

(65) Prior Publication Data

US 2009/0309057 A1  Dec. 17, 2009

(51) Int. Cl.
  *F16K 31/05* (2006.01)
  *F16K 31/53* (2006.01)
  *F16K 37/00* (2006.01)

(52) U.S. Cl.
  USPC .............. 251/129.03; 251/249.5; 137/556

(58) Field of Classification Search
  USPC ............. 251/249.5, 248, 129.03, 68, 69, 70, 251/71, 553, 556, 251, 259; 137/553, 556
  See application file for complete search history.

(56) References Cited

U.S. PATENT DOCUMENTS

| | | | |
|---|---|---|---|
| 1,898,242 A * | 2/1933 | Chandler ..................... 251/76 |
| 1,966,209 A * | 7/1934 | Miller ..................... 251/129.03 |
| 2,229,165 A * | 1/1941 | Bowland ..................... 138/94.5 |
| 2,565,457 A * | 8/1951 | Spender ..................... 239/456 |
| 3,572,384 A * | 3/1971 | Taylor ..................... 137/625.5 |
| 4,133,288 A * | 1/1979 | Burgess ..................... 116/277 |
| 4,149,561 A * | 4/1979 | Dalton ..................... 137/556 |
| 4,393,965 A * | 7/1983 | Zouzoulas ..................... 192/48.91 |
| 4,433,957 A * | 2/1984 | Nakanishi ..................... 433/105 |
| 4,474,078 A | 10/1984 | Denkowski et al. |
| 4,562,908 A * | 1/1986 | Zouzoulas ..................... 192/48.5 |
| 4,616,528 A | 10/1986 | Malinski et al. |
| 4,994,001 A | 2/1991 | Wilkinson et al. |
| 5,477,752 A | 12/1995 | West et al. |
| 7,055,795 B2 | 6/2006 | Lay |

\* cited by examiner

*Primary Examiner* — John K Fristoe, Jr.
*Assistant Examiner* — Jonathan Waddy
(74) *Attorney, Agent, or Firm* — Armstrong Teasdale LLP

(57) ABSTRACT

A manual valve operator with override clutch apparatus for selectively actuating a valve. The manual valve operator includes an operator housing defining an enclosure. An input shaft is rotatably supported by the housing and a worm wheel has a first and a second side, the second side of the worm wheel defining a clutch drive. The worm wheel intermeshes with the input shaft such that when the input shaft is driven, the input shaft drives the worm wheel and the clutch drive about a rotational axis. A sleeve has an outer surface which defines an annular groove. The sleeve has a driven end and an output end. The driven end of the sleeve cooperates with the clutch drive of the worm wheel for selective engagement of the clutch drive and the driven end of the sleeve.

1 Claim, 5 Drawing Sheets

MANUAL VALVE OPERATOR WITH OVERRIDE CLUTCH APPARATUS

BACKGROUND OF THE INVENTION

1. Field of the Invention

The present invention relates to a manual valve operator with override clutch apparatus.

More specifically, the present invention relates to a manual valve operator with override clutch apparatus for manually actuating a valve in the event of power source failure to a primary automated valve actuator.

2. Background Information

Pneumatic pipelines and the like include quarter-turn control valves such as ball, plug or butterfly valves spaced along the length of the line. Such valves are relatively massive and include a flow restricting device supported within the valve housing for rotation about a diametric axis of the valve. When the valve is in a closed disposition for interrupting the pneumatic line, the periphery of the flow restricting device cooperates with a corresponding valve seating defined by the valve housing. However, when the valve is moved to an open disposition thereof, torque is applied to the stem of the valve by a driven shaft which is anchored to the flow restricting device, the driven shaft rotating about the diametric axis of the valve.

An automated valve actuator is the primary source for driving the driven shaft for moving the flow restricting device of the valve between the open and closed dispositions thereof. However, in the event of power source loss to the automated valve actuator, the driven shaft can no longer be driven. Accordingly, according to the present invention, a manual valve operator with override is able to be clutched into engagement with the driven shaft to drive the driven shaft for turning the flow restricting device of the valve.

According to the present invention, the manual valve operator with override clutch includes an input shaft with a gear which intermeshes with a worm wheel so that rotation of the input shaft causes rotation of the worm wheel. In turn, the worm wheel drives the driven shaft for moving the valve between the open and closed dispositions thereof.

The present invention overcomes the problem caused by a power source loss to the primary valve actuator by permitting selective engagement of the manual valve operator with override clutch apparatus for driving the driven shaft of the valve thus facilitating operation of the valve.

Thus the primary feature of the present invention is to provide a manual valve operator with override clutch apparatus that enables manual operation of the valve.

Another important feature of the present invention is to provide a manual valve operator with override clutch apparatus that prevents any back pressure from a valve being transmitted to an input shaft of the manual valve operator when disengaged.

A further important feature of the present invention, is the provision of a manual valve operator with override clutch apparatus that provides a visual indication of the rotational disposition of the worm wheel relative to the operator housing.

Other features and advantages of the present invention will be readily apparent to those skilled in the art by a consideration of the detailed description of a preferred embodiment of the present invention contained herein.

SUMMARY OF THE INVENTION

The present invention relates to a manual valve operator with override clutch apparatus for selectively actuating a valve. The apparatus includes an operator housing defining an enclosure. An input shaft is rotatably supported by the housing and a worm wheel has a first and a second side, the second side of the worm wheel defining a clutch drive. The worm wheel is disposed within the housing and intermeshes with the input shaft such that when the input shaft is driven, the input shaft drives the worm wheel and the clutch drive about a rotational axis.

A sleeve has an outer surface which defines an annular groove. The sleeve has a driven end and an output end. The driven end of the sleeve cooperates with the clutch drive of the worm wheel for selective engagement of the clutch drive and the driven end of the sleeve. A clutch actuating handle is rotatably supported by the housing. The clutch actuating handle has a first and a second end. The second end of the clutch actuating handle defines an offset clutch driver which slidably cooperates with the annular groove of the sleeve. The arrangement is such that when the handle is rotated relative to the housing, the offset clutch driver rides within the annular groove for urging the sleeve axially along the rotational axis. Thus, in a first axial disposition of the sleeve, the clutch drive of the worm wheel and the driven end of the sleeve are engaged relative to each other so that the sleeve is rotated by the worm wheel about the rotational axis. However, when the sleeve is disposed in a second axial disposition thereof, the driven end of the sleeve is disengaged relative to the clutch drive of the worm wheel.

A driven shaft has a first and a second end, the second end of the driven shaft being secured to the valve. The driven shaft extends coaxially through the sleeve, the driven shaft being keyed to the sleeve such that relative rotation between the sleeve and the driven shaft is inhibited while axial movement of the sleeve relative to the driven shaft is permitted. The arrangement is structured such that when the sleeve is in the first axial disposition thereof, the worm wheel drivably rotates the sleeve so that the rotating sleeve rotatably drives the driven shaft for actuating the valve. Also, when the sleeve is in the second axial disposition thereof, the driven end of the sleeve is disengaged from the clutch drive of the worm wheel so that rotation of the sleeve and the driven shaft keyed thereto is inhibited.

In a more specific embodiment of the present invention, the input shaft defines a gear.

Moreover, the worm wheel defines gear teeth which intermesh with the gear of the input shaft so that when the input shaft is driven, the worm wheel is driven about the rotational axis.

Furthermore, the clutch drive includes a plurality of clutch teeth such that when the worm wheel is rotated by the input shaft, the plurality of clutch teeth rotate about the rotational axis.

Also, the sleeve is selectively rotated by the clutch drive about the rotational axis and the outer surface of the sleeve is of cylindrical configuration.

Additionally, the annular groove is coaxial relative to the rotational axis.

Further, the driven end of the sleeve defines a further plurality of clutch teeth, the further plurality of clutch teeth of the sleeve being driven by the plurality of clutch teeth of the worm wheel when the sleeve is disposed in the engaged first axial disposition thereof.

More particularly, the clutch actuating handle is of cylindrical configuration, the first end of the clutch actuating handle defining a knurled surface for facilitating rotation of the clutch actuating handle by an operator thereof.

Also, the offset clutch driver includes a roller which extends from the second end of the clutch actuating handle.

More specifically, the clutch actuating handle includes a portion of cylindrical configuration, the portion being supported for rotation within a bore defined by the operator housing. The bore has an axis which is disposed normal to the rotational axis.

Additionally, the offset clutch driver extends from the cylindrical portion, the offset clutch driver being of cylindrical configuration. The offset clutch driver has a further axis which is disposed parallel to and spaced relative to the axis of the bore such that when the portion is rotated within the bore about the axis of the bore, the offset clutch driver rides within the annular groove of the sleeve so that regardless of a rotational disposition of the sleeve. The offset clutch driver rides within the annular groove so that the sleeve is urged by the offset clutch driver axially along the rotational axis such that the sleeve is moved by the offset clutch driver between the first and second axial dispositions of the sleeve.

Moreover, the offset clutch driver is a roller. The roller is bearingly mounted relative to the portion of the clutch actuating handle so that the roller rotates about the further axis.

In a preferred embodiment of the present invention, a further clutch actuating handle is disposed diametrically opposite to the clutch actuating handle relative to the sleeve.

The further clutch actuating handle includes a further portion of cylindrical configuration. The further portion is supported for rotation within a further bore defined by the operator housing. The further bore has the same axis as the bore, such axis being disposed normal to the rotational axis.

Additionally, a further offset clutch driver extends from the further cylindrical portion. The further offset clutch driver is of cylindrical configuration and has a second axis which is disposed parallel to and spaced relative to the axis of the bores. The arrangement is such that when the portions are rotated within their respective bores about the axis of the bores, the offset clutch drivers ride within the annular groove of the sleeve so that regardless of a rotational disposition of the sleeve, the offset clutch drivers ride diametrically opposite to each other within the annular groove. The apparatus is arranged so that the sleeve is urged by the offset clutch drivers axially along the rotational axis such that the sleeve is moved by the offset clutch drivers between the first and second axial dispositions of the sleeve.

Furthermore, the driven shaft rotates about the rotational axis. The driven shaft defines a longitudinal key which extends radially therefrom. The longitudinal key extends between the first and second ends of the driven shaft. The longitudinal key cooperates with a corresponding longitudinal slot defined by the sleeve so that when the sleeve is in the first axial disposition thereof, the sleeve is rotating about the rotational axis and the cooperating longitudinal key and slot cause rotation of the driven shaft coaxially within the sleeve about the rotational axis. The cooperating longitudinal key and slot also permit axial movement of the sleeve along the driven shaft to the second axial disposition of the sleeve so that transmission of any back pressure exerted upon the manual valve is not transmitted back to the input shaft.

The apparatus according to the present invention also includes an indicator arm which has a proximal and a distal end. The proximal end of the indicator arm is secured to the second side of the worm wheel.

Also, a window is defined by the operator housing such that the distal end of the indicator arm is visible through the window for indicating a rotational disposition of the worm wheel relative to the operator housing.

Many modifications and variations of the present invention will be readily apparent to those skilled in the art by a consideration of the detailed description with particular reference to the annexed drawings that show a preferred embodiment of the present invention. However, such modifications and variations fall within the spirit and scope of the present invention as defined by the appended claims.

Included in such modifications would be the provision of a further key extending from the diametrically opposite side of the driven shaft, such further key cooperating and sliding axially within a further slot defined by the sleeve.

Also, the keys could be secured to the sleeve and the longitudinal slots would in this case be defined by the driven shaft.

BRIEF DESCRIPTION OF THE DRAWINGS

Similar reference characters refer to similar parts throughout the various views of the drawings.

DETAILED DESCRIPTION OF THE DRAWINGS

Figure 1:
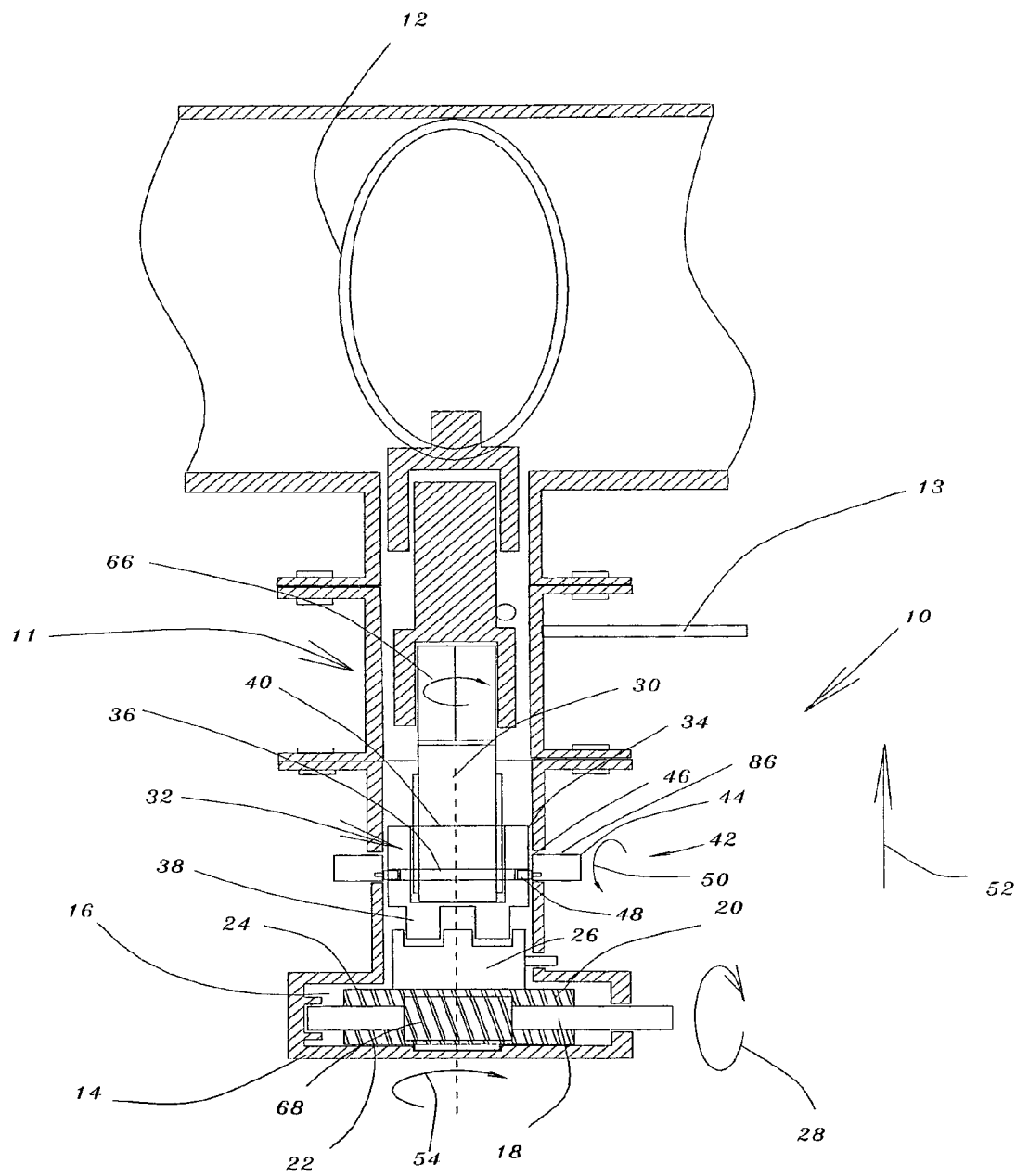
FIG. 1 is a side elevational view of a manual valve operator with override clutch apparatus according to the present invention for selectively actuating a valve.

FIG. 1 is a side elevational view of a manual valve operator with override clutch apparatus generally designated 10 according to the present invention for selectively actuating a valve 12. The manual valve operator with override clutch apparatus 10 is operated when an automated actuator generally designated 11 connected to a power source 13 becomes inoperable due to loss of power from the power source 13.

As shown in FIG. 1, the apparatus 10 includes an operator housing 14 defining an enclosure 16. An input shaft 18 is rotatably supported by the housing 14 and a worm wheel 20 has a first and a second side 22 and 24 respectively. The second side 24 of the worm wheel 20 defines a clutch drive 26. The worm wheel 20 is disposed within the housing 14 and intermeshes with the input shaft 18 such that when the input shaft 18 is driven as indicated by the arrow 28, the input shaft 18 drives the worm wheel 20 and the clutch drive 26 about a rotational axis 30.

A sleeve generally designated 32 has an outer surface 34 which defines an annular groove 36. The sleeve 32 has a driven end 38 and an output end 40. The driven end 38 of the sleeve 32 cooperates with the clutch drive 26 of the worm wheel 20 for the selective engagement of the clutch drive 26 and the driven end 38 of the sleeve 32.

A clutch actuating handle generally designated 42 is rotatably supported by the housing 14. The clutch actuating handle 42 has a first and a second end 44 and 46 respectively. The second end 46 of the clutch actuating handle 42 defines an offset clutch driver 48 which slidably cooperates with the annular groove 36 of the sleeve 32. The arrangement is such that, when the handle 42 is rotated as indicated by the arrow 50 relative to the housing 14, the offset clutch driver 48 rides within the annular groove 36 for urging the sleeve 32 axially as indicated by the arrow 52 along the rotational axis 30

FIG. 1 shows a first axial disposition of the sleeve 32. As shown in FIG. 1, the clutch drive 26 of the worm wheel 20 and the driven end 38 of the sleeve 32 are engaged relative to each other so that the sleeve 32 is rotated as indicated by the arrow 54 by the worm wheel 20 about the rotational axis 30.

Figure 2:
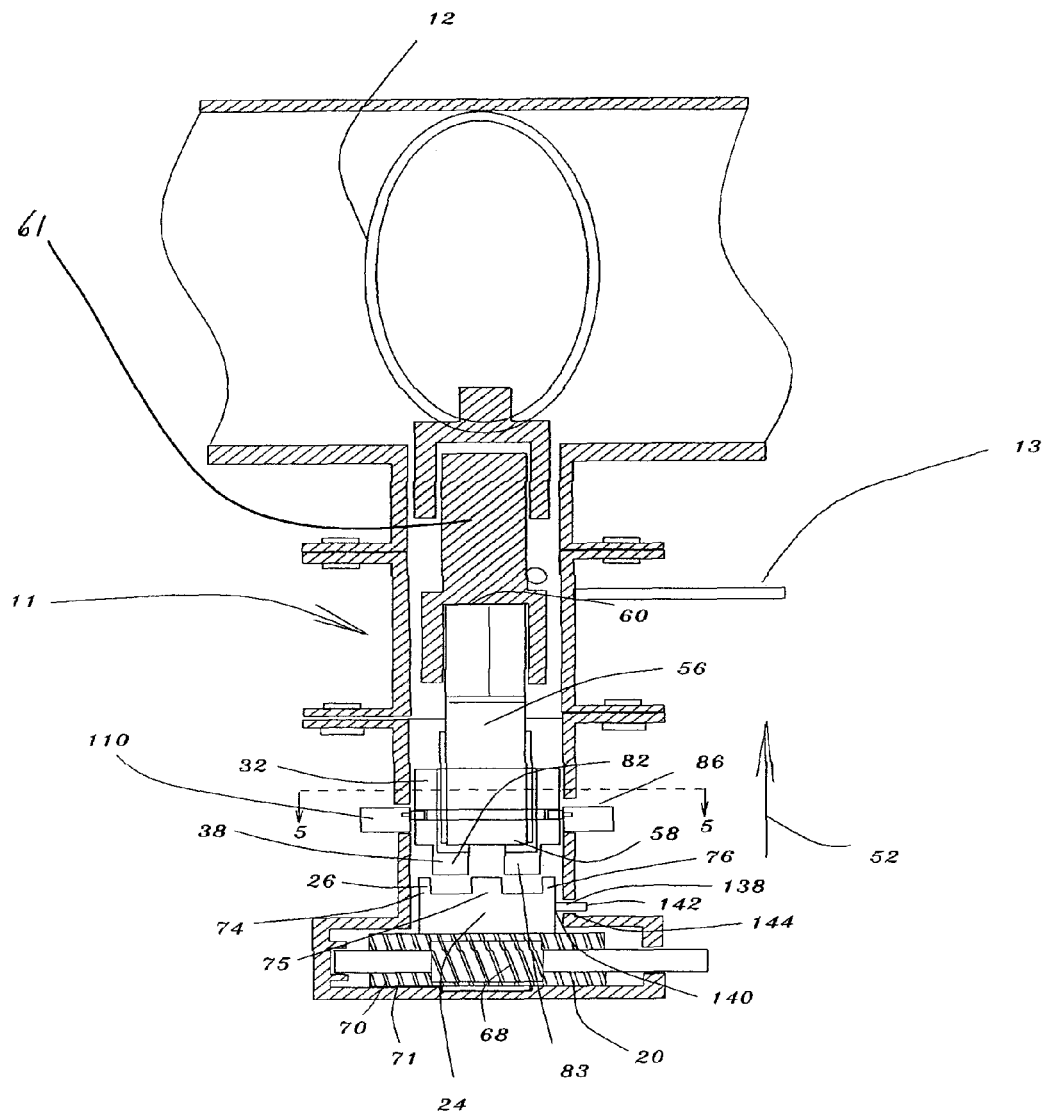
FIG. 2 is a similar view to that shown in FIG. 1 but shows the sleeve disposed in a second axial disposition thereof.

FIG. 2 is a similar view to that shown in FIG. 1 but shows the sleeve 32 disposed in a second axial disposition thereof. As shown in FIG. 2, when the sleeve 32 is disposed in the second axial disposition thereof, the driven end 38 of the sleeve 32 is disengaged relative to the clutch drive 26 of the worm wheel 20.

A driven shaft generally designated 56 has a first and a second end 58 and 60 respectively. The second end 60 of the driven shaft 56 is secured to the manual valve 12 by means of a further driven shaft 61 of the actuator 11. The end of the further driven shaft 61 cooperates with the second end 60 of the driven shaft 56 such that rotation of the driven shaft 56 causes rotation of the further driven shaft 61. The driven shaft 56 and further driven shaft 61 are preferably connected such that axial movement between the shafts 56 and 61 is permitted.

The driven shaft 56 extends coaxially through the sleeve 32, the driven shaft 56 being keyed to the sleeve 32 such that relative rotation between the sleeve 32 and the driven shaft 56 is inhibited while axial movement as indicated by the arrow 52 of the sleeve 32 relative to the driven shaft 56 is permitted. The arrangement is structured such that when the sleeve 32 is in the first axial disposition thereof as shown in FIG. 1, the worm wheel 20 drivably rotates the sleeve 32 as indicated by the arrow 54 so that the rotating sleeve 32 rotatably drives the driven shaft 56 as indicated by the arrow 66 for actuating the valve 12 via the further driven shaft 61 of the actuator 11. Also, when the sleeve 32 is in the second axial disposition thereof as shown in FIG. 2, the driven end 38 of the sleeve 32 is disengaged from the clutch drive 26 of the worm wheel 20 so that rotation of the sleeve 32 and the driven shaft 56 keyed thereto is inhibited.

In a more specific embodiment of the present invention as shown in FIGS. 1 and 2, the input shaft 18 defines a gear 68.

Moreover, the worm wheel 20 defines gear teeth 70 and 71 which intermesh with the gear 68 of the input shaft 18 so that when the input shaft 18 is driven as indicated by the arrow 28, the worm wheel 20 is driven about the rotational axis 30.

As shown in FIG. 2, the clutch drive 26 includes a plurality of clutch teeth 74, 75 and 76 such that when the worm wheel 20 is rotated by the input shaft 18, as indicated by the arrow 54, the plurality of clutch teeth 74-76 rotate about the rotational axis 30.

Also, the sleeve 32 is selectively rotated by the clutch drive 26 about the rotational axis 30 as indicated by the arrow 54.

Additionally, the outer surface 34 of the sleeve 32 is of cylindrical configuration and the annular groove 36 is coaxial relative to the rotational axis 30.

As shown in FIG. 2, the driven end 38 of the sleeve 32 defines a further plurality of clutch teeth 82 and 83, the further plurality of clutch teeth 82-83 of the sleeve 32 being driven by the plurality of clutch teeth 74-76 of the worm wheel 20 when the sleeve 32 is disposed in the first axial disposition thereof as shown in FIG. 1.

More particularly, the clutch actuating handle 42 is of cylindrical configuration, the first end 44 of the clutch actuating handle 42 defining a knurled surface 86 for facilitating rotation of the clutch actuating handle 42 by an operator thereof as indicated by the arrow 50.

Figure 3:
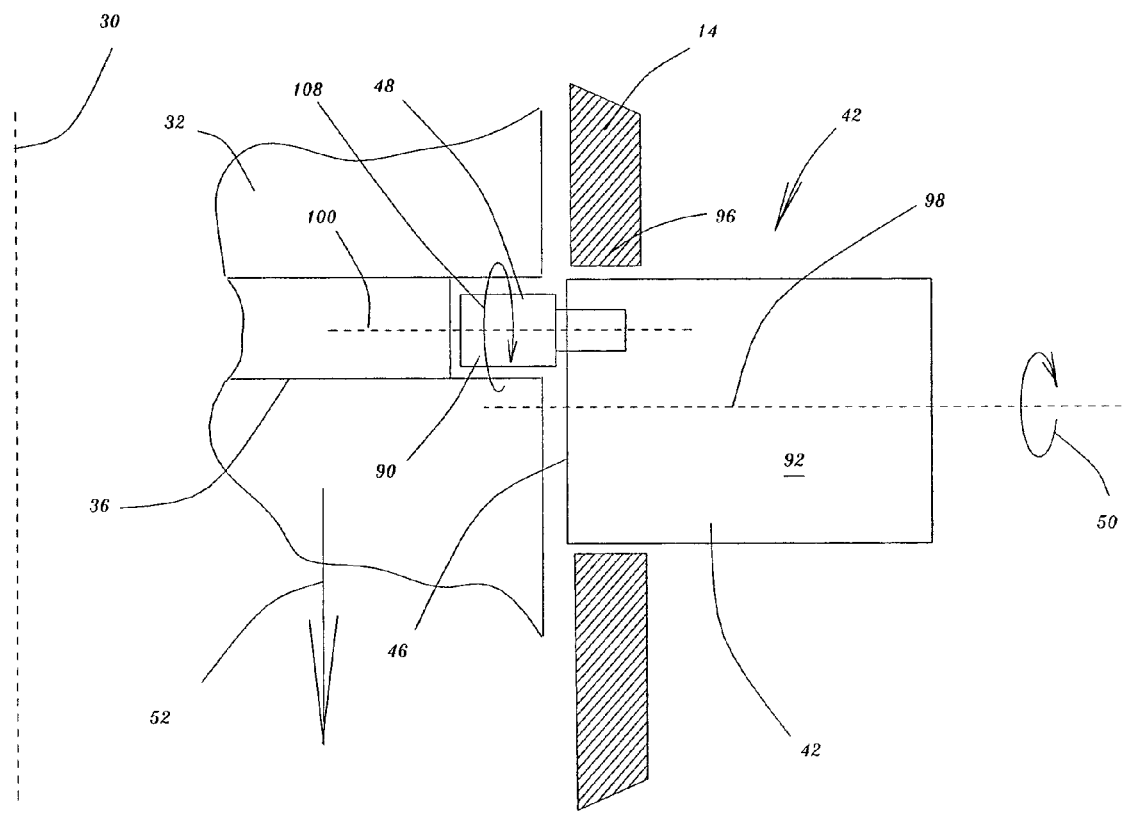
FIG. 3 is an enlarged view of the offset clutch driver shown in FIG. 1.

FIG. 3 is an enlarged view of the offset clutch driver 48 shown in FIG. 1. As shown in FIG. 3, the offset clutch driver 48 includes a roller 90 which extends from the second end 46 of the clutch actuating handle 42.

More specifically, the clutch actuating handle 42 includes a portion 92 of cylindrical configuration, the portion 92 being supported for rotation as indicated by the arrow 50 within a bore 96 defined by the operator housing 14. The bore 96 has an axis 98 which is disposed normal to the rotational axis 30.

Additionally, the offset clutch driver 48 extends from the cylindrical portion 92, the offset clutch driver 48 being of cylindrical configuration. The offset clutch driver 48 has a further axis 100 which is disposed parallel to and spaced relative to the axis 98 of the bore 96 such that when the portion 92 is rotated as indicated by the arrow 50 within the bore 96 about the axis 98 of the bore 96, the offset clutch driver 48 rides within the annular groove 36 of the sleeve 32. The arrangements is such that regardless of a rotational disposition of the sleeve 32, the offset clutch driver 48 rides within the annular groove 36 so that the sleeve 32 is urged, as indicated by the arrow 52, by the offset clutch driver 48 axially along the rotational axis 30 so that the sleeve 32 is moved as indicated by the arrow 52 by the offset clutch driver 48 between the first and second axial dispositions of the sleeve 32 as shown in FIGS. 1 and 2 respectively.

The roller 90 is bearingly mounted relative to the portion 92 of the clutch actuating handle 42 so that the roller 90 rotates as indicated by the arrow 108 about the further axis 100.

In a preferred embodiment of the present invention, as shown in FIG. 2, a further clutch actuating handle 110 is disposed diametrically opposite to the clutch actuating handle 42 relative to the sleeve 32.

Figure 4:
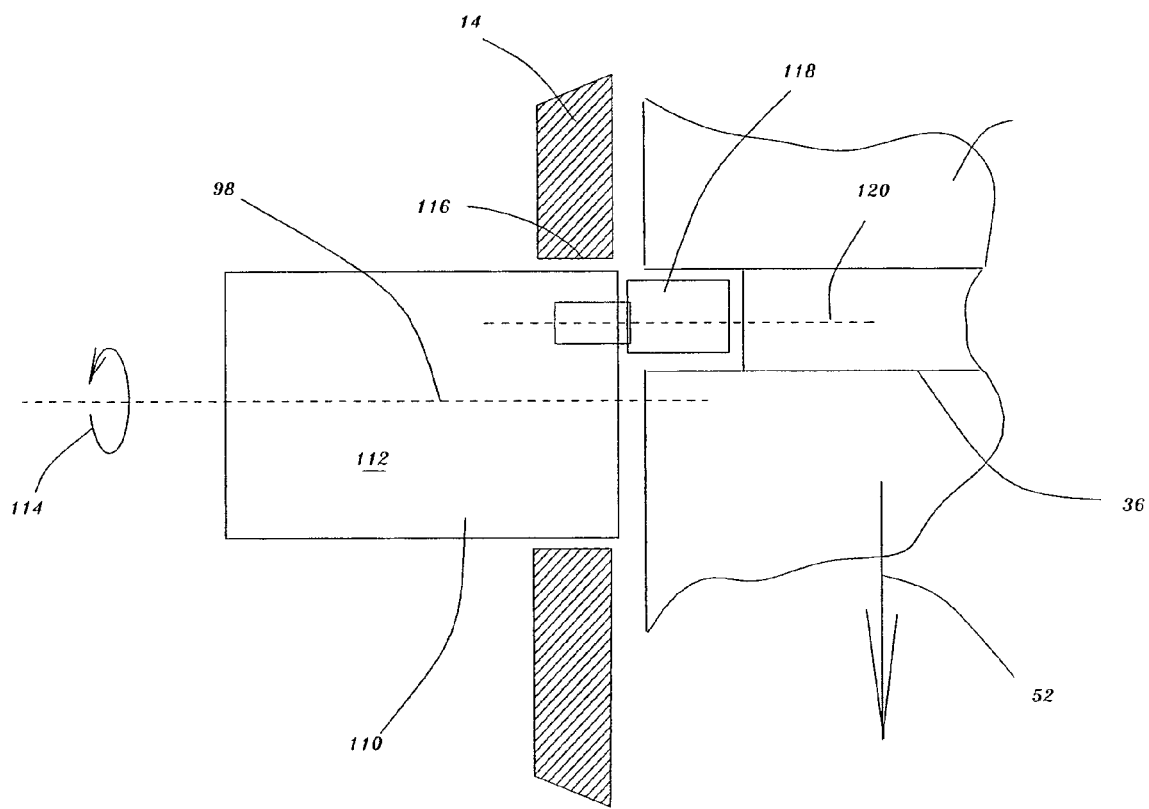
FIG. 4 is an enlarged view of the further clutch actuating handle shown in FIG. 2.

FIG. 4 is an enlarged view of the further clutch actuating handle 110 shown in FIG. 2. As shown in FIG. 4, the further clutch actuating handle 110 includes a further portion 112 of cylindrical configuration. The further portion 112 is supported for rotation, as indicated by the arrow 114, within a further bore 116 defined by the operator housing 14. The further bore 116 has the same axis 98 as the bore 96, such axis 98 being disposed normal to the rotational axis 30.

Additionally, a further offset clutch driver 118 extends from the further cylindrical portion 112. The further offset clutch driver 118 is of cylindrical configuration and has a second axis 120 which is disposed parallel to and spaced relative to the axis 98 of the bores 96 and 116. Normally, the axis 120 will be that same as the axis 100. The arrangement is such that when the portions 92 and 112 are rotated within their respective bores 96 and 116 about the axis 98 of the bores 96 and 116 as indicated by the arrows 50 and 114 respectively, the offset clutch drivers 48 and 118 respectively ride within the annular groove 36 of the sleeve 32 so that regardless of a rotational disposition of the sleeve 32, the offset clutch drivers 48 and 118 ride diametrically opposite to each other within the annular groove 36. The apparatus 10 is arranged so that the sleeve 32 is urged by the offset clutch drivers 48 and 118 axially along the rotational axis 30 as indicated by the arrow 52 such that the sleeve 32 is moved by the offset clutch drivers 48 and 118 between the first and second axial dispositions of the sleeve 32 as shown respectively in FIGS. 1 and 2.

Figure 5:
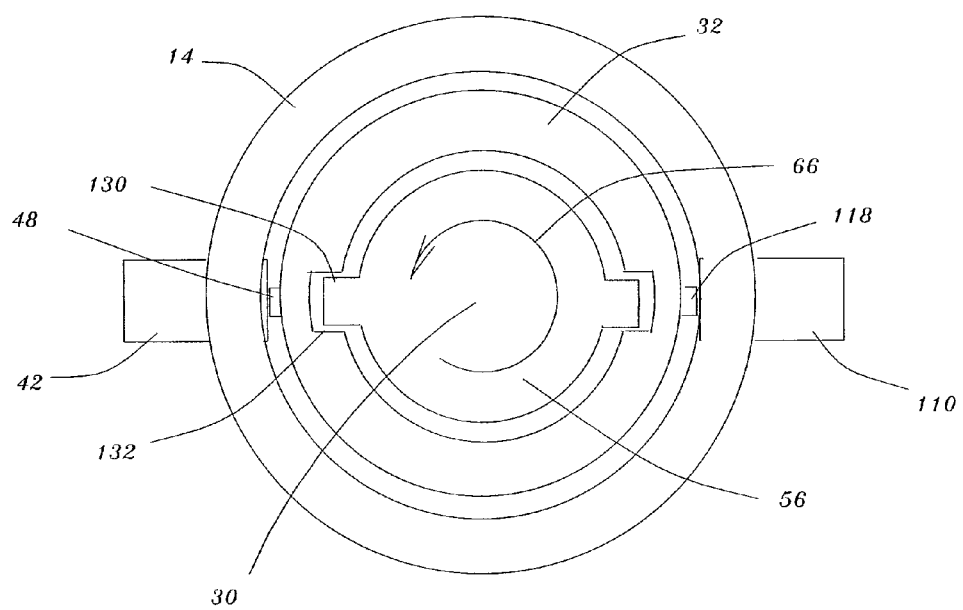
FIG. 5 is a sectional view taken on the line 5-5 of FIG. 2.

FIG. 5 is a sectional view taken on the line 5-5 of FIG. 2. As shown in FIG. 5, the driven shaft 56 rotates about the rotational axis 30 as indicated by the arrow 66. The driven shaft 56 defines a longitudinal key 130 which extends radially from the driven shaft 56. The longitudinal key 130 extends between the first and second ends 58 and 60 respectively of the driven shaft 56. The longitudinal key 130 cooperates with a corresponding longitudinal slot 132 defined by the sleeve 32 so that when the sleeve 32 is in the first axial disposition thereof as shown in FIG. 1, the sleeve 32 is rotating as indicated by the arrow 66 about the rotational axis 30, and the cooperating longitudinal key 130 and slot 132 cause rotation of the driven shaft 56 coaxially within the sleeve 32 about the rotational axis 30. The cooperating longitudinal key 130 and slot 132 also permit axial movement as indicated by the arrow 52 of the sleeve 32 along the driven shaft 56 to the second axial disposition of the sleeve 32 as shown in FIG. 2, so that transmission of any back pressure exerted upon the valve 12 is not transmitted back to the input shaft 18.

As shown in FIG. 2, the apparatus 10 according to the present invention also includes an indicator arm 138 which has a proximal and a distal end 140 and 142 respectively. The proximal end 140 of the indicator arm 138 is secured to the second side 24 of the worm wheel 20.

Also, a window 144 is defined by the operator housing 14 such that the distal end 142 of the indicator arm 138 is visible through the window 144 for indicating a rotational disposition of the worm wheel 20 relative to the operator housing 14.

In operation of the manual valve operator with override clutch apparatus according to the present invention, in the event of a power failure, the input shaft 18 is manually rotated as indicated by the arrow 28, so that the gear 68 drives the worm wheel 20. Accordingly, the worm wheel 20 rotates about the rotational axis 30. Consequently, the clutch teeth 74-76 of the worm wheel 20 drive the sleeve 32 when the sleeve is in the first disposition thereof as shown in FIG. 1. Because the sleeve 32 is connected to the driven shaft 56 by the interaction of the key 130 and the slot 132, the driven shaft 56 will drive the further driven shaft 61 of the actuator 11, for manually driving the valve 12 between an open and a closed disposition thereof.

Those skilled in the art will appreciate that when the valve 12 is disposed in a pneumatic line or the like, considerable torque is exerted on the valve 12 by for example the pneumatic pressure of the line. Such torque is transmitted back through the further driven shaft 61 to the driven shaft 56. Consequently, when the automated valve actuator loses power for any reason, it is very important to control such back torque applied through the driven shaft. The present invention enables an operator to manually rotate the clutch actuating handles 42 and 110 so that the sleeve 32 is urged from the second disposition thereof as shown in FIG. 2 to the engaged first disposition of the sleeve 32 so that rotation of the driven shaft 56 is controlled from the worm wheel 20. Thus, in the engaged first disposition of the sleeve 32, as shown in FIG. 1, the worm wheel 20 including the operator housing 14 can be used to control the valve 12 by overcoming the torque by engaging the worm wheel 20 and input shaft 18.

The present invention provides a unique manual valve operator with override clutch apparatus that greatly facilitates engagement and disengagement of the manual valve operator from the valve.

What is claimed is:

1. A manual valve operator with override clutch apparatus for selectively actuating a valve, said apparatus comprising:

an operator housing defining an enclosure;

an input shaft rotatably supported by said housing;

a worm wheel having a first and a second side, said second side of said worm wheel defining a clutch drive, said worm wheel being disposed within said housing and intermeshing with said input shaft such that when said input shaft is driven, said input shaft drives said worm wheel and said clutch drive about a rotational axis;

a sleeve having an outer surface defining an annular groove, said sleeve having a driven end and an output end, said driven end of said sleeve cooperating with said clutch drive of said worm wheel for selective engagement of said clutch drive and said driven end of said sleeve;

a clutch actuating handle rotatably supported by said housing, said clutch actuating handle including:

a portion of cylindrical configuration, said portion being supported for rotation within a bore defined by said operator housing, said bore having an axis which is disposed normal to and intersects said rotational axis;

said clutch actuating handle having a first and a second end, said second end of said clutch actuating handle defining an offset clutch driver which slidably cooperates with said annular groove of said sleeve, the arrangement being such that when said handle is rotated relative to said housing, said offset clutch driver rides within said annular groove for urging said sleeve axially along said rotational axis so that in a first axial disposition of said sleeve, said clutch drive of said worm wheel and said driven end of said sleeve are engaged relative to each other so that said sleeve is rotated by said worm wheel about said rotational axis and so that when said sleeve is disposed in a second axial disposition thereof, said driven end of said sleeve is disengaged relative to said clutch drive of said worm wheel;

a driven shaft having a first and a second end, said second end of said driven shaft being connected to the valve, said driven shaft extending coaxially through said sleeve, said driven shaft being keyed to said sleeve such that relative rotation between said sleeve and said driven shaft is inhibited while axial movement of said sleeve relative to said driven shaft is permitted, the arrangement being structured such that when said sleeve is in said first axial disposition thereof, said worm wheel drivably rotates said sleeve so that said rotating sleeve rotatably drives said driven shaft for actuating the valve and when said sleeve is in said second axial disposition thereof, said driven end of said sleeve is disengaged from said clutch drive of said worm wheel so that rotation of said sleeve and said driven shaft keyed thereto by said input shaft is inhibited;

said input shaft defining a worm gear;

said worm wheel defining gear teeth which intermesh with said worm gear of said input shaft so that when said input shaft is driven, said worm wheel is driven about said rotational axis;

said clutch drive including:

a plurality of clutch teeth such that when said worm wheel is rotated by said input shaft, said plurality of clutch teeth rotate about said rotational axis;

said sleeve being selectively rotated by said clutch drive about said rotational axis;

said outer surface of said sleeve being of cylindrical configuration;

said annular groove being coaxial relative to said rotational axis;

said driven end of said sleeve defining a further plurality of clutch teeth, said further plurality of clutch teeth of said sleeve being driven by said plurality of clutch teeth of said worm wheel when said sleeve is disposed in said first axial disposition thereof;

said clutch actuating handle being of cylindrical configuration;

said first end of said clutch actuating handle defining a knurled surface for facilitating rotation of said clutch actuating handle by an operator thereof;

said offset clutch driver including:

a roller extending from said second end of said clutch actuating handle;

said offset clutch driver extending from said cylindrical portion, said offset clutch driver being of cylindrical configuration and having a further axis which is disposed parallel to and spaced relative to said axis of said bore such that when said portion is rotated within said bore about said axis of said bore, said offset clutch driver rides within said annular groove of said sleeve so that regardless of a rotational disposition of said sleeve, said offset clutch driver rides within said annular groove so that said sleeve is urged by said offset clutch driver axially along said rotational axis such that said sleeve is moved by said offset clutch driver between said first and second axial dispositions of said sleeve;

said roller being bearingly mounted relative to said portion of said clutch actuating handle so that said roller rotates about said further axis;

a further clutch actuating handle disposed diametrically opposite to said clutch actuating handle relative to said sleeve;

said further clutch actuating handle including:

a further portion of cylindrical configuration, said further portion being supported for rotation within a further bore defined by said operator housing, said further bore having the same axis as said bore, such axis being disposed normal to said rotational axis;

a further offset clutch driver extending from said further cylindrical portion, said further offset clutch driver being of cylindrical configuration and having a second axis which is disposed parallel to and spaced relative to said axis of said bores such that when said portions are rotated within their respective bores about said axis of said bores, said offset clutch drivers ride within said annular groove of said sleeve so that regardless of a rotational disposition of said sleeve, said offset clutch drivers ride diametrically opposite to each other within said annular groove so that said sleeve is urged by said offset clutch drivers axially along said rotational axis such that said sleeve is moved by said offset clutch drivers between said first and second axial dispositions of said sleeve;

said driven shaft rotating about said rotational axis;

said driven shaft defining a longitudinal key which extends radially therefrom, said longitudinal key extending between said first and second ends of said driven shaft, said longitudinal key cooperating with a corresponding longitudinal slot defined by said sleeve so that when said sleeve is in said first axial disposition thereof so that said sleeve is rotating about said rotational axis, said cooperating longitudinal key and slot cause rotation of said driven shaft coaxially within said sleeve about said rotational axis, said cooperating longitudinal key and slot also permitting axial movement of said sleeve along said driven shaft to said second axial disposition of said sleeve so that transmission of any back pressure exerted upon the valve is not transmitted back to said input shaft;

an indicator arm having a proximal and a distal end, said proximal end of said indicator arm being secured to said second side of said worm wheel; and a window defined by said operator housing such that said distal end of said indicator arm is visible through said window for indicating a rotational disposition of said worm wheel relative to said operator housing.

* * * * *

UNITED STATES PATENT AND TRADEMARK OFFICE
CERTIFICATE OF CORRECTION

| | | |
|---|---|---|
| PATENT NO. | : 8,544,817 B2 | Page 1 of 1 |
| APPLICATION NO. | : 12/157597 | |
| DATED | : October 1, 2013 | |
| INVENTOR(S) | : Domenico Liccardi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1332 days.

Signed and Sealed this
Third Day of March, 2015

Michelle K. Lee
*Deputy Director of the United States Patent and Trademark Office*